(12) United States Patent
Gao et al.

(10) Patent No.: US 12,647,227 B2
(45) Date of Patent: Jun. 2, 2026

(54) SIMULTANEOUS DOWNLINK TRANSMISSION AND UPLINK PANEL SWITCHING

(71) Applicant: ZTE Corporation, Shenzhen (CN)

(72) Inventors: Bo Gao, Shenzhen (CN); Zhaohua Lu, Shenzhen (CN); Ke Yao, Shenzhen (CN); Yang Zhang, Shenzhen (CN); Zhen He, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 323 days.

(21) Appl. No.: 17/866,134

(22) Filed: Jul. 15, 2022

(65) Prior Publication Data

US 2022/0353036 A1 Nov. 3, 2022

Related U.S. Application Data

(63) Continuation of application No. PCT/CN2020/107902, filed on Aug. 7, 2020.

(51) Int. Cl.
H04L 5/00 (2006.01)
H04L 1/1812 (2023.01)

(52) U.S. Cl.
CPC .......... H04L 5/0048 (2013.01); H04L 1/1812 (2013.01); H04L 5/0053 (2013.01)

(58) Field of Classification Search
None
See application file for complete search history.

(56) References Cited

U.S. PATENT DOCUMENTS

| | | | | |
|---|---|---|---|---|
| 2019/0166645 A1* | 5/2019 | Sadiq | .................. | H04B 7/0617 |
| 2019/0260458 A1 | 8/2019 | Zhou et al. | | |
| 2019/0306765 A1* | 10/2019 | Cirik | ................. | H04W 36/0058 |
| 2019/0306850 A1 | 10/2019 | Zhang et al. | | |
| 2020/0021350 A1 | 1/2020 | Koskela et al. | | |
| 2020/0028547 A1 | 1/2020 | Gao et al. | | |
| 2020/0068462 A1 | 2/2020 | Zetterberg et al. | | |
| 2021/0021325 A1* | 1/2021 | Davydov | .............. | H04W 76/19 |
| 2021/0289540 A1* | 9/2021 | Khoshnevisan | ...... | H04L 1/1812 |
| 2021/0377852 A1* | 12/2021 | Zhou | ..................... | H04W 76/28 |

(Continued)

FOREIGN PATENT DOCUMENTS

| | | |
|---|---|---|
| CN | 109923896 A | 6/2019 |
| CN | 110612752 A | 12/2019 |

(Continued)

OTHER PUBLICATIONS

Vivo, "Further discussion on Multi-Beam Operation," 3GPP TSG RAN WG1 #97, R1-1906160, Reno, USA, May 13-17, 2019 (9 pages).

(Continued)

*Primary Examiner* — Jenkey Van
(74) *Attorney, Agent, or Firm* — Perkins Coie

(57) ABSTRACT

In one aspect, a method of wireless communications is disclosed. The method includes receiving, by a wireless device from a network device, one or more reference signals. The method further includes transmitting, by the wireless device, a report, wherein the report includes at least one of a first reference signal, a channel quality, an uplink transmission parameter, a first group information, a carrier component, or a control resource set pool.

7 Claims, 9 Drawing Sheets

500

Receiving, by a wireless device from a network device, one or more reference signals
510

Transmitting, by the wireless device, a report, wherein the report includes at least one of a first reference signal, a channel quality, an uplink transmission parameter, a first group information, a carrier component, or a control resource set pool
520

(56) References Cited

U.S. PATENT DOCUMENTS

| | | | |
|---|---|---|---|
| 2022/0007306 A1 | 1/2022 | Cheng et al. | |
| 2022/0046740 A1* | 2/2022 | Lo ......................... | H04W 76/19 |
| 2022/0302989 A1* | 9/2022 | Zhang ............... | H04W 74/0841 |
| 2023/0189373 A1* | 6/2023 | Matsumura ........... | H04W 76/19 |
| | | | 370/329 |

FOREIGN PATENT DOCUMENTS

| | | | |
|---|---|---|---|
| CN | 111278089 A | 6/2020 | |
| JP | 2020-072421 A | 5/2020 | |
| JP | 2020-516189 A | 5/2020 | |
| JP | 7762274 B2 | 10/2025 | |
| WO | 2019193581 A2 | 10/2019 | |
| WO | WO-2020113009 A1 * | 6/2020 | ......... H04B 7/06964 |
| WO | 2020141951 A1 | 7/2020 | |

OTHER PUBLICATIONS

ZTe, "Enhancements on multi-beam operation," 3GPP TSG RAN WG1 Meeting #98, R1-1908192, Prague, CZ, Aug. 26-30, 2019 (26 pages).

Extended European Search Report for European Patent Application No. 20948063.1, mailed Aug. 11, 2023 (7 pages).

Office Action for Japanese Patent Application No. 2022-542693, mailed Nov. 17, 2023, with English summary (14 pages).

Nokia et al., "Enhancements on Multi-beam Operation," 3GPP TSG RAN WG1 Meeting #97, Reno, USA, R1-1907317, 19 pages, May 13-17, 2019.

International Search Report and Written Opinion for International Application No. PCT/CN2020/107902, mailed on May 6, 2021 (7 pages).

Office Action for Chinese Patent Application No. 202080102802.7, mailed Apr. 19, 2024, with English summary (12 pages).

Office Action for Japanese Patent Application No. 2022-542693, mailed May 31, 2024, with English summary (12 pages).

Office Action for Chinese Patent Application No. 202080102802.7, mailed Sep. 12, 2024 (13 pages).

CNIPA, Notification to Complete Formalities of Registration for Chinese Application No. 202080102802.7, mailed on Mar. 31, 2025, 11 pages with unofficial English translation.

Huawei, "Enhancements on Multi-TRP/panel transmission," 3GPP TSG RAN WG1 Meeting #96bis, Xi'an, China, R1-1903970, Apr. 8-12, 2019, 20 pages.

CMCC, "Discussion on multi-TRP/panel transmission," 3GPP TSG RAN WG1 #99, Reno, USA, R1-1912542, Nov. 18-22, 2019, 5 pages.

Office Action for Korean Patent Application No. 10-2022-7023857, mailed Jan. 9, 2025, with English summary (5 pages).

Office Action for Chinese Patent Application No. 202080102802.7, mailed Dec. 13, 2024 (13 pages).

Office Action for Japanese Patent Application No. 2024-171038, mailed Jul. 1, 2025, with English summary (10 pages).

Office Action for Korean Patent Application No. 10-2022-7023857, mailed Jul. 21, 2025, with English summary (4 pages).

Notice of Acceptance for South African Patent Application No. 2022/07604, mailed Aug. 13, 2025 (1 page).

Substantive Examination from Malaysian Patent Application No. PI 2022003704 dated Jan. 28, 2026, 3 pages.

Notice of Allowance for Korean Patent Application No. 10-2022-7023857, mailed Feb. 19, 2026, with English summary (9 pages).

Intel Corporation, "Summary on SCell BFR and L1-SINR based beam selection," 3GPP TSG RAN WG1 Ad-Hoc Meeting 1901 Taipei, Jan. 21-25, 2019, R1-1901443, 21 pages.

* cited by examiner

Data transmission for link-2
@UE panel-2

Data transmission for link-1
@ UE panel-1

UE (2 panels for UL transmission)

Figure 5:
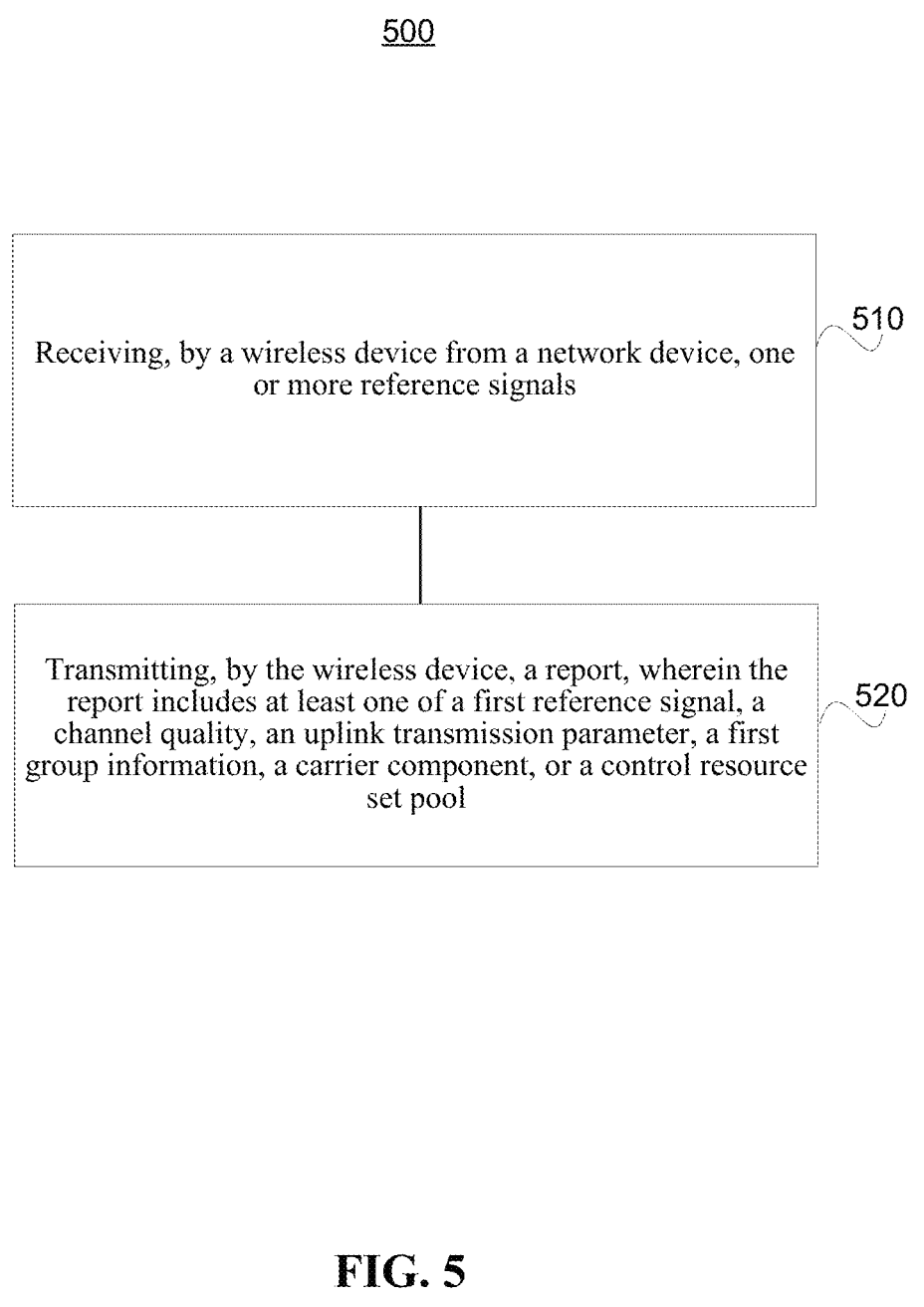

500

```
┌─────────────────────────────────────────────────┐
│                                                  │
│                                                  │──── 510
│  Receiving, by a wireless device from a network  │
│  device, one or more reference signals           │
│                                                  │
│                                                  │
└─────────────────────────────────────────────────┘
                        │
                        │
┌─────────────────────────────────────────────────┐
│                                                  │
│  Transmitting, by the wireless device, a report, │
│  wherein the report includes at least one of a   │──── 520
│  first reference signal, a channel quality, an   │
│  uplink transmission parameter, a first group    │
│  information, a carrier component, or a control   │
│  resource set pool                               │
└─────────────────────────────────────────────────┘
```

SIMULTANEOUS DOWNLINK TRANSMISSION AND UPLINK PANEL SWITCHING

CROSS REFERENCE TO RELATED APPLICATIONS

This patent document is a continuation of and claims benefit of priority to International Patent Application No. PCT/CN2020/107902, filed on Aug. 7, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques, and apparatuses for improving the efficiency of wireless communication.

In one aspect, a method of wireless communications is disclosed. The method includes receiving, by a wireless device from a network device, one or more reference signals. The method further includes transmitting, by the wireless device, a report, wherein the report includes at least one of a first reference signal, a channel quality, an uplink transmission parameter, a first group information, a carrier component, or a control resource set pool.

In another aspect, another method of wireless communications is disclosed. The method includes detecting, by a wireless device, a triggering event limiting a transmitted power by a first beam of a wireless device, wherein the first beam has a maximum power reduction that is greater than or equal to a first threshold or an uplink duty cycle that is greater than or equal to a second threshold. The method further includes identifying, by the wireless device, a new beam wherein the new beam has a value of a second maximum power reduction subtracted from a reference signal receive power that is greater than or equal to a third threshold. The method further includes reporting, by the wireless device to the network device, at least one parameter of the new beam in a report, wherein the report is transmitted via a MAC-CE maximum power reduction procedure or power headroom reporting procedure.

In another aspect, another method of wireless communications is disclosed. The method includes transmitting, by a network device to a wireless device, one or more reference signals. The method further includes receiving, by the network device, a report, wherein the report includes at least one of a first reference signal, a channel quality, an uplink transmission parameter, a first group information, a carrier component, or a control resource set pool.

These, and other, aspects are described in the present document.

BRIEF DESCRIPTION OF DRAWINGS

FIG. 5 shows an example of a method performed at a wireless device.

DETAILED DESCRIPTION

Figure 1:
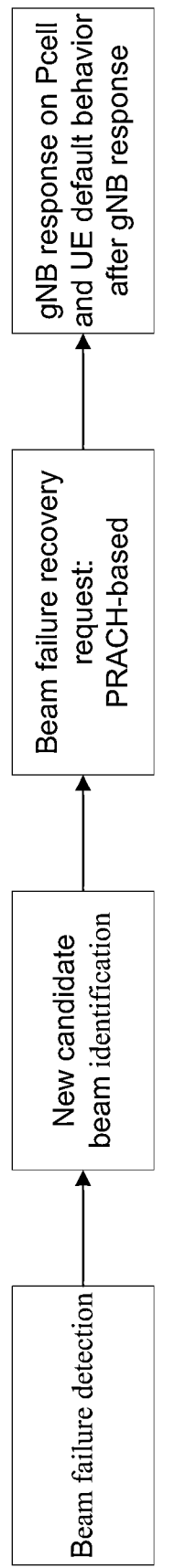
FIG. 1 shows an example of a link recovery procedure.

Certain features are described using the example of Fifth Generation (5G) wireless protocol. However, applicability of the disclosed techniques is not limited to only 5G wireless systems. Headings are used in the following description only to aid understanding without limiting the features described.

In 5G New Radio (NR), analog beam-forming beside digital beam-forming is introduced into mobile networks for providing robustness of communications at high-frequencies above 6 GHz. However, directional radio frequency (RF) transmissions using analog beam-forming techniques have limited multipath diversity which makes above 6 GHz communications vulnerable to channel fluctuations, e.g., human or vehicle blockage. A link recovery procedure (also referred to as a beam recovery procedure) enables a wireless device (also referred to herein as UE) initialized one event-driven reporting of a beam failure event and identifying a new beam for subsequent data transmission. A link recovery may include the following steps: a) beam failure detection, b) new candidate beam identification, c) beam failure recovery request (BFR) (also called as link failure recovery request) from the UE to the next generation node B (gNB), and d) gNB response for recovery. The procedure can be configured for primary cell (PCell) or primary second cell (PSCell), both of which are configured with uplink (UL) channels for carrying step-c link recovery request (i.e., physical random-access channel (PRACH)). Herein, if there is no special description, "PCell" is equivalent to primary cell or primary cell in its corresponding cell group, e.g., PSCell.

For a second cell (SCell), the MAC-CE+PUCCH-BFR procedure is further introduced for the case. Compared to PCell, the link recovery procedure also includes the following four steps: a) beam failure detection, b) new candidate beam identification, c) beam failure recovery request (BFR) from UE to gNB, and d) gNB response for recovery. But, the BFR procedure is further divided into two sub-steps of requesting uplink shared channel (UL-SCH) resource through PUCCH-BFR signaling and reporting the failed CC index (corresponding to a failed SCell) and the related new candidate beam index.

The current 5G NR solution is based on the scenario that there is only a single panel in the UE side, which means that only one DL TX beam can be received, or only one UL TX beam can be transmitted at a given time instant. In order words, if the UE has multiple panels, the UE panel activation or deactivation is totally up to UE implementation. However, this architecture of beam management has serious limitation on transmission performance and UE-side power saving, when the UE actually has multiple panels.

For transmission performance (regardless of DL and UL transmission), the simultaneous multi-beam transmission with multiple panels can support higher RANK transmission and get more spatial diversity gain, which means that the channel capacity can be improved significantly.

For UE-side power saving or maximum power exposure (MPE), due to lack of UE-side preference about panel state (such as idle or active) and measurement results for each of panel, some low-performance panel may always be active if the UL beam of the panel is configured for dynamic indication by gNB.

The legacy link recovery procedure is not suitable for this multi-panel operation case (e.g., only portion of panels experiences beam failure). The disclosed techniques including a procedure of UE initialized DL simultaneous transmission mode and UL panel switching solve this problem.

The triggering event, the format of UE reporting, the signaling of gNB response and default UE behavior after gNB response should be fully considered. As a UE initialized procedure, the UL resource has to be reserved for this, and the corresponding UE behavior during this procedure should be specified clearly.

Considering CC group and multi-TPR case, the scope or condition for the UE initialized procedure, e.g., triggering event, or updating default beam and UL transmission resource, should be fully studied for a part of CC group or a single TRP of multi-TRP, once the procedure is completed successfully.

In order to support the backward and forward compatibility, UE capability about supporting the procedure and enabling signaling from gNB should be considered. Also, the timeline for applying the new identified beam or panel should be fully considered.

As the expense of wide or ultra-wide spectrum resources, the considerable propagation loss induced by the extremely high frequency becomes a noticeable challenge. To solve this, antenna array and beam-forming training technologies using massive MIMO, e.g., up to 1024 antenna elements for one node, have been adopted to achieve beam alignment and obtain sufficiently high antenna gain. To keep low implementation cost while still benefit from antenna array, analog phase shifters become very attractive for implementing mmWave beam-forming, which means that the number of controllable phases is finite and the constant modulus constraints are placed on these antenna elements. Given the pre-specified beam patterns, the variable-phase-shift-based BF training targets to identify the best pattern for subsequent data transmission generally, in the one-TRP and one-panel case.

In order to guarantee robustness, UE can initialize one link recovery procedure in PCell, as shown in the FIG. 1, where the link recovery request transmission is based on PRACH. In PCell, the detailed procedure for contention free based link recovery is summarized as following:

Beam failure detection: One or more DL RSs are configured or implicitly derived for beam failure detection, and the corresponding BLER results (as the metric for beam failure detection) is determined through measuring the one or more DL RSs. When the BLER of all or partial of the DL RSs is not worse than the pre-defined threshold within one configured window, one indication of link failure is notified to MAC-CE layer. In MAC-CE layer, if the indication of link failure is received from PHY layer, UE shall increment the counter for beam failure indication, i.e., BFI_COUNTER, by 1, and when the BFI_COUNTER is not less than the pre-configured one threshold, one beam failure event is declared.

New candidate beam identification: One or more DL RSs are configured as candidate RSs for new candidate beam identification. If the L1-RSRP results (as the metric for new beam identification) associated with the one DL RS is not worse than the pre-defined threshold, a single DL RS can be assumed as one new candidate beam, i.e., q_new.

Beam failure recovery request (BFR): When beam failure event is declared and/or at least one new candidate beam is found, the UE shall initialize one PRACH transmission associated with the selected RS q_new from step-b (when channel quality of any DL RSs as candidate beam for recovery is all worse than the threshold, any one of DL RS can be selected randomly), where each DL RS for new beam identification is associated with one or more PRACH occasions.

gNB response for recovery: After transmitting PRACH transmission for link recovery request, the UE should monitor PDCCH in one dedicated CORESET or dedicated searching space for link recovery according to the quasi co-location parameter associated with the DL RS q_new. Once detecting the gNB response, UE should assume that gNB response for recovery is received successfully and the corresponding UE behaviors, e.g., updating QCL assumption for one or more CORESETs and spatial filter of PUCCH resources, are performed.

Then, for a second cell (SCell), MAC-CE+PUCCH-BFR procedure as link recovery request is further introduced to replace the PRACH based one. Compared with PCell, the link recovery procedure also includes the above four steps. But, the BFR procedure, i.e., link recovery request, is further divided into two sub-steps of requesting uplink shared channel (UL-SCH) resource through PUCCH-BFR signaling and reporting the failed CC index (corresponding to a failed SCell) and the related new candidate beam index.

Figure 2A:
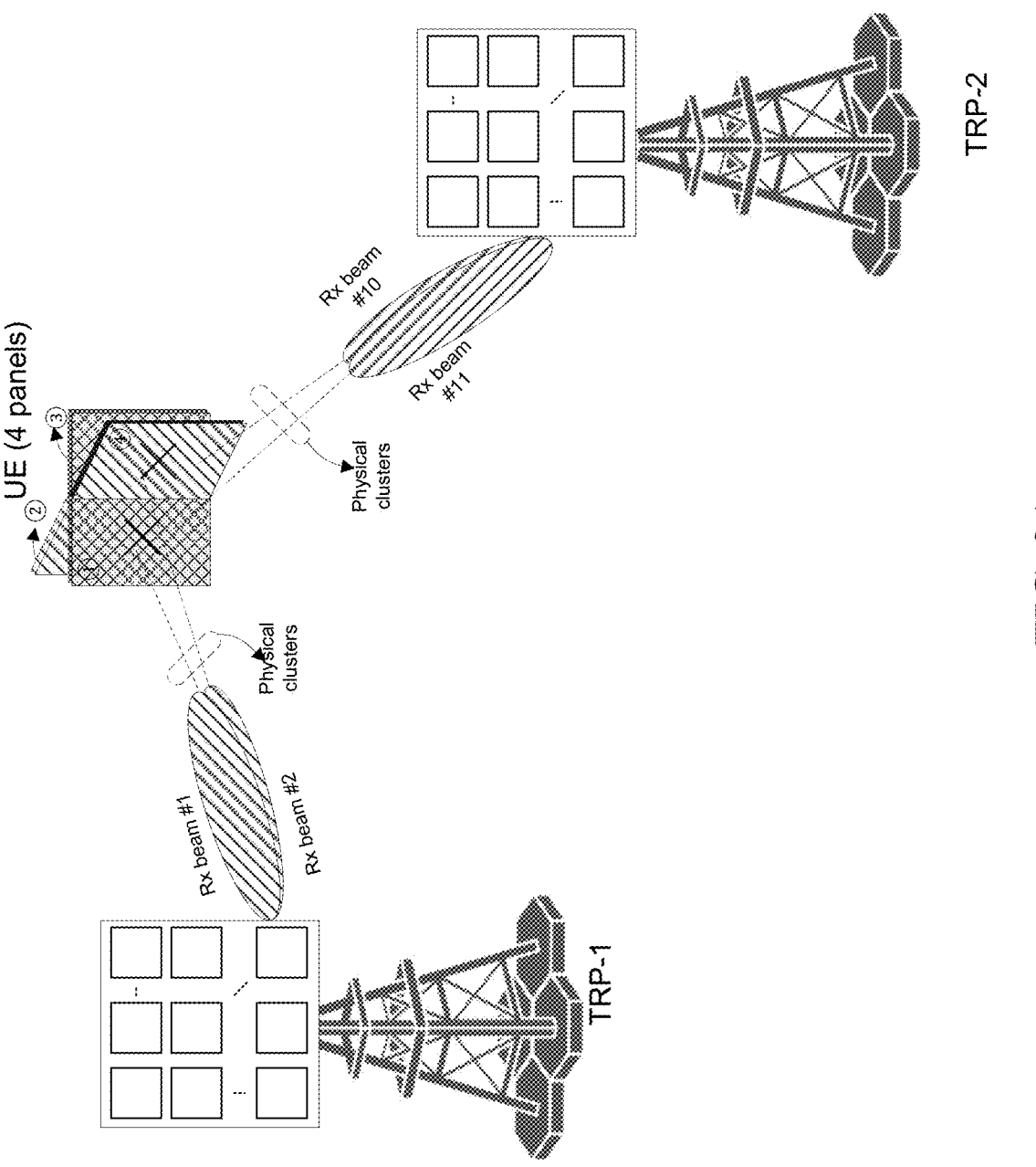
FIG. 2A shows an example of beam measurement and reporting where UE side has four panels.

Generally, the multi-TRP and multi-panel cases should be considered for beyond 5G gNB (base station) and the next-generation communications, and meanwhile there are multiple panels for UE in order to cover whole space for enhancing coverage. FIG. 2A shows an example of beam measurement and reporting where UE side has four panels. As a typical case, a panel for TRP and UE sides has two TXRUs, which are associated with cross polarization accordingly. Therefore, in order to achieve high RANK or multi-layer transmission, the TRP and UE should try to use different beams generated from different panels, which is also called as simultaneous transmission across multiple panel (STxMP), with objective of sufficiently using capability of each panel, such as its associated TXRUs.

Furthermore, some CC(s) may be grouped into a set, and the DL and UL beam management can be performed together using a unified signaling, e.g., updating TCI beam/beam pool for PDCCH/CORESET, PDSCH or SRS across multiple CCs by a single command.

As used herein, a "beam" is equivalent to quasi-co-location (QCL) state, transmission configuration indicator (TCI) state, spatial relation state (also called as spatial relation information state), reference signal (RS), spatial filter or pre-coding. Specifically, In some embodiments, a "Tx beam" is equivalent to QCL state, TCI state, spatial relation state, DL/UL reference signal (such as channel state information reference signal (CSI-RS), synchronization signal block (SSB) (which is also called as SS/PBCH), demodulation reference signal (DMRS), sounding reference signal (SRS), and physical random access channel (PRACH)), Tx spatial filter or Tx precoding;

In some embodiments, a "Rx beam" is equivalent to QCL state, TCI state, spatial relation state, spatial filter, Rx spatial filter or Rx precoding;

In some embodiments, a "beam ID" is equivalent to QCL state index, TCI state index, spatial relation state index, reference signal index, spatial filter index or precoding index.

Specifically, the spatial filter can be either UE-side or gNB-side one, and the spatial filter is also called as spatial-domain filter.

In some embodiments, "spatial relation information" is includes one or more reference RSs, which is used to represent "spatial relation" between targeted "RS or channel" and the one or more reference RSs, where "spatial relation" means the same/quasi-co beam(s), same/quasi-co spatial parameter(s), or same/quasi-co spatial domain filter(s).

In some embodiments, a "spatial relation" means the beam, spatial parameter, or spatial domain filter.

In some embodiments, a "QCL state" includes one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] Spatial parameter (which is also called as spatial Rx parameter). In this patent, "TCI state" is equivalent to "QCL state". In this patent, there are the following definitions for 'QCL-TypeA', 'QCL-TypeB', 'QCL-TypeC', and 'QCL-TypeD'.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

As used herein, a "UL signal" can be PRACH, PUCCH, PUSCH, UL DMRS, or SRS.

In some embodiments, a "DL signal" can be PDCCH, PDSCH, SSB, DL DMRS, or CSI-RS.

In some embodiments, a group based reporting includes at least one of "beam group" based reporting and "antenna group" based reporting.

In some embodiments, a "beam group" includes different Tx beams within one group can be simultaneously received or transmitted, and/or Tx beams between different groups may NOT be simultaneously received or transmitted. Furthermore, the definition of "beam group" is described from the UE perspective.

In some embodiments, an "antenna group" is different Tx beams within one group may NOT be simultaneously received or transmitted, and/or Tx beams between different groups can be simultaneously received or transmitted.

In some embodiments, an "antenna group" is more than N different Tx beams within one group can NOT be simultaneously received or transmitted, and/or no more than N different Tx beams within one group can be simultaneously received or transmitted, where N is positive integer.

In some embodiments, an "antenna group" is Tx beams between different groups can be simultaneously received or transmitted.

In some embodiments, an "antenna group" is described from the UE perspective.

In some embodiments, an antenna group is equivalent to antenna port group, panel or UE panel. Furthermore, antenna group switching is equivalent to panel switching.

In some embodiments, the "group information" is equivalent to "information grouping one or more reference signals", "resource set", "panel", "sub-array", "antenna group", "antenna port group", "group of antenna ports", "beam group", "transmission entity/unit", or "reception entity/unit". Furthermore, the "group information" is to represent the UE panel and some features related to the UE panel. Furthermore, the "group information" is equivalent to "group state" or "group ID".

In some embodiments, a "time unit" can be sub-symbol, symbol, slot, subframe, frame, or transmission occasion.

In some embodiments, the active antenna group can be equivalent to active DL antenna group only, active UL antenna group only, or active DL and UL antenna group.

In some embodiments, the UL power control parameter includes target power (also called as P0), path loss RS (also called as coupling loss RS), scaling factor for path loss (also called as alpha), and closed loop process.

In some embodiments, a MAC-CE message comprises at least one of a reporting power headroom or a message of reporting maximum power reduction.

First Example: UE Initialized Simultaneous DL Transmission and UL Panel Switching As UE event-driven procedure for updating the DL simultaneous transmission and UL active panel, the aspects about triggering event, format of UE reporting, gNB response and default UE behavior after gNB response should be specified.

Step-1: For Triggering Event, at Least One of the Following should be Supported

Step-1a: TRP/Panel-Specific Beam Failure Detection, or Panel Switching Detection For the first DL RS or first group information (corresponding to a current or old link, e.g., for PDCCH).

The channel quality, e.g., block error ratio (BLER), uplink duty cycle or maximum power reduction (MPR), corresponding to the first DL RS or first group information is higher than or equal to a threshold.

The channel quality, e.g., path loss, RSRP, or CQI, corresponding to the first DL RS or first group information is lower than or equal to a threshold.

The above event corresponds to a panel, a CC/BWP in a CC/BWP group, or a CORESET in a CORESET pool.

Furthermore, the mapping between first DL RS and first group information is changed. In other words, the channel quality based on the first DL RS and first group information is worse than or equal to the threshold.

Step-1b: New Candidate Beam/Panel Identification

For the second DL RS or second group information (corresponding to a new link)

The channel quality, e.g., block error ratio, BLER, uplink duty cycle or maximum power reduction (MPR), is lower than or equal to a threshold.

The channel quality, e.g., path loss, RSRP or CQI, is higher than or equal to a threshold.

The first and second DL RS correspond to the same group information, the same CC/BWP in a CC/BWP group, or the same CORESET pool.

Furthermore, the channel quality based on the second DL RS and second group information is better than or equal to the threshold.

Furthermore, the event condition further comprises that the channel quality based on the first DL RS and first group information is worse than the channel quality based on the second DL RS and second group information.

Furthermore, the event condition further comprises that the channel quality based on the first DL RS and first group information is worse than the channel quality based on the second DL RS and second group information+an offset. Furthermore, the offset is configurable.

Furthermore, the channel quality corresponds to the changes of channel quality, e.g., the changes over the last reporting.

Step-2: Procedure of UE Reporting, e.g., Report Format

The second DL RS (corresponding to the new link as for new candidate beam/panel identification), second group information, CC or CC group, channel quality (e.g., MPR, RSRP, CQI), or CORESET pool are reported in the report format.

The report is carried by PUCCH, UCI (e.g., as a RSRP, SINR or CSI reporting) or MAC-CE (e.g., an MPR or PHR reporting).

The second DL RS or corresponding channel quality is associated with the second group information, CC, CC group or CORESET pool.

Furthermore, the channel quality of second DL RS is received according to the group information.

Furthermore, the second DL RS can be applied for the CC, CC group, or CORESET pool.

Step-3: Procedure of gNB Response, e.g., Signaling of gNB Response

Furthermore, the signaling can be a DCI or MAC-CE command for confirming the UE reporting, e.g., switching simultaneous transmission mode or active UL panel for transmission.

Furthermore, the signaling can be at least one of the following:

1 PDCCH or DCI with the dedicated RNTI for the procedure;

2 PDCCH or DCI in the control resource set (CORESET) or search space for the procedure;

3 DCI codepoint associated with the procedure;

4 An indication for new data for a PUSCH carrying the report, e.g., the toggled new data indication;

Further condition: the indication for new data is associated with the same HARQ process number as the PUSCH carrying the report.

5 Reconfiguration or activation of a TCI associated with PDCCH, or reconfiguration or activation of spatial relation associated with PUCCH.

Step-4: Default UE Behavior after gNB Response

At least one of the following is supported.

Mapping between the second DL RS and the second group information is applied.

A DL signal is received according to the QCL assumption corresponding to the second DL RS.

Furthermore, the DL signal and the second DL RS are associated with the same CC/BWP, same CC/BWP group or same CORESET pool.

Furthermore, the DL signal and the second DL RS are associated with the same group information, e.g., UE panel.

A UL signal is transmitted according to the spatial relation corresponding to the second DL RS or according to the second DL RS as path loss RS.

Furthermore, the UL signal and the second UL RS are associated with the same CC/BWP, same CC/BWP group or same CORESET pool.

Furthermore, the UL signal and the second UL RS are associated with the same group information, e.g., UE panel.

The second DL RS can be applied to the CC/BWP, or the CC/BWP group, or the CORESET pool corresponding to the first DL RS.

Furthermore, when the CC is reported in the step-2, the second DL RS or second group information is applied to all CCs in the CC group including the CC.

Notes that the step-1 may NOT always be necessary, and, in some cases, alternatively, the following step 2-4 is controlled by the gNB only. For instance, the step-2 procedure of UE reporting is controlled and initialized by gNB (e.g., a periodic or aperiodic beam or panel reporting), and the corresponding step 3 and step 4 are performed accordingly (e.g., based on the report results in the step 2).

Figure 2B:
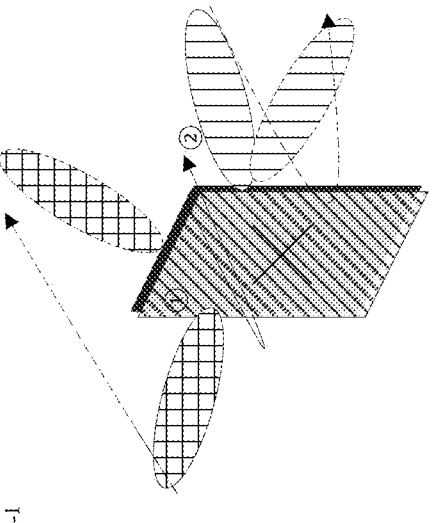
FIG. 2B shows an example of wireless device initialized reporting with UE rotation.

In FIG. 2B is an example of a UE initialized reporting considering UE rotation. FIG. 2B shows a same DL Tx beam but different UE DL Rx beam for a transmission under UE rotation. Firstly, the data link transmission for link-1 and data link transmission for link-2 can be received simultaneously through the two independent UE panels. But, after a period, the UE rotation occurs, and the corresponding link-1 and link-2 are shared with the same UE panel, which means that the UE cannot receive the link-1 and link-2 simultaneously. It should be noted that, from gNB perspective, the gNB Tx beam is kept unchanged. For the perspective of triggering condition, the channel quality of data transmission based on the UE panel-1 is worse than that of data transmission based on the UE panel-2. Consequently, the mapping between DL RS and group information (e.g., UE panel) can be reported to gNB according to the event of mapping change.

Figure 3:
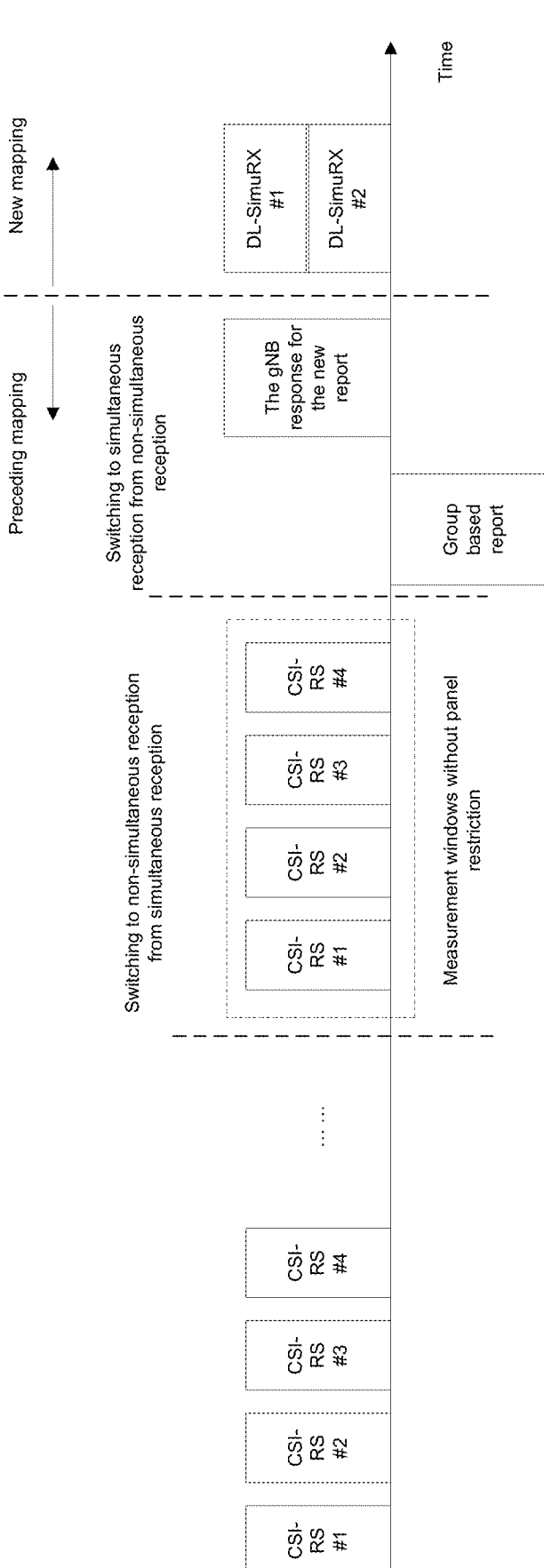
FIG. 3 shows an example of a wireless device initialized reporting for downlink simultaneous transmission.

Second Example: Procedure for UE Initialized DL Simultaneous Transmission Switching Regarding UE initialized DL simultaneous transmission, a UE can support simultaneous reception mode through using two or more independent UE panels. After receiving the UE capability reporting of supporting this simultaneous mode, the gNB can configure an enabling signaling of a DL channel with two or more different TCI/QCL states or receiving two independent DL channels simultaneously. Also the group information indication for updating DL and/or UL transmission should be considered according to the UE initialized reporting. One example can be found in FIG. 3.

Within the measurement window, the panel restriction or mapping between a DL RS and a panel is not applied, and consequently the UE can find a best mapping between a DL RS and a panel, e.g., with the objective of maximizing RSRP. That means that, during this period, the non-simultaneous reception mode is performed by the UE.

After the measurement window, the UE should switch to the mode of simultaneous reception from non-simultaneous reception. But, due to no reporting and gNB response, the UE should perform the preceding the mapping between the DL RS and group information.

Then, a group-based reporting is initialized by the UE to provide one or more DL RS and the corresponding group information, which means that the new mapping between DL RS and group information is provided.

Once receiving the gNB response for the new report, the new mapping between DL RS and group information is applied accordingly.

Third Example: Procedure for UE Reporting Driven by an MPE Event

Figure 4:
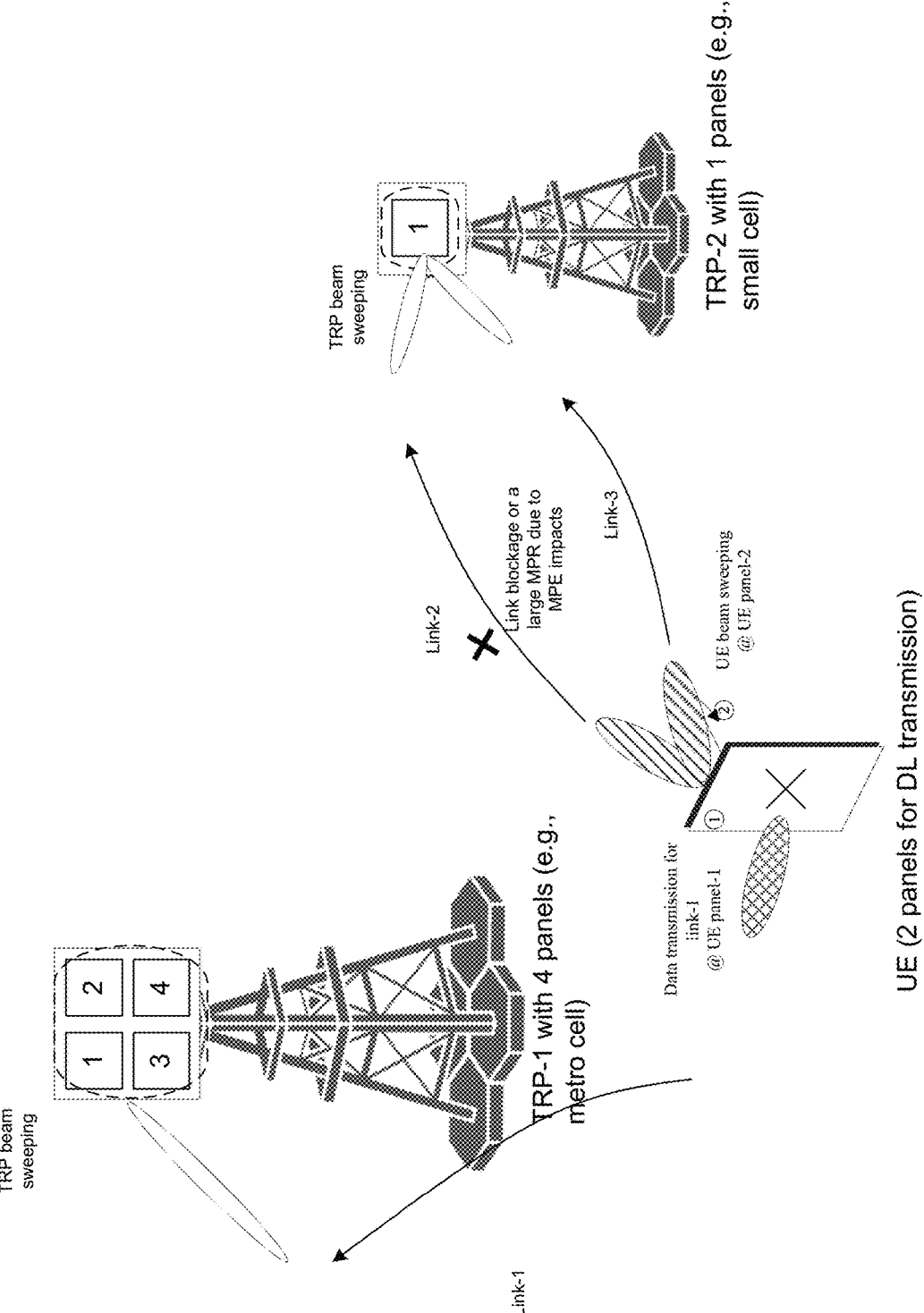
FIG. 4 UE shows an example of a procedure considering beam-specific maximum power exposure (MPE) impact.

In order to prevent from radio power considering human health, the MPE requirement should be met according to the local law or regulation. More specifically, the additional MPR (which is also called as P-MPE) is further applied for maximum transmission power of UL transmission. That means that, even if the UE can support stronger transmission power, the UE have to reduce the maximum transmission power due to the MPE impact. One example can be found in FIG. 4, where there is the strong MPE impacts for link-2.

For triggering event, at least one of the following should be supported

For the first DL RS or a first group information, the corresponding maximum power reduction (MPR) or uplink duty cycle is higher than or equal to a threshold.

For the second DL RS or a second panel, the corresponding RSRP minus the MPR related to the second DL RS or the second panel is higher than or equal to a threshold.

The first and second DL RS correspond to the same group information, the same CC/BWP in a CC/BWP group, or the same CORESET pool.

The format of UE reporting

Second DL RS, second group information, channel quality (e.g., MPR and RSRP) are reported in the report format.

The report is carried by a MAC-CE about MPR or PHR procedure.

When the MAC-CE is for PHR reporting, the PHR results are determined according to the second DL RS and/or second group information.

The signaling of gNB response

Furthermore, the signaling can be an indication for new data (in the received HARQ information) for a PUSCH carrying the report is received. Further condition: the indication for new data is associated with the same HARQ process number.

Default UE behavior after gNB response, at least one of following is applied

Mapping between the second DL RS and the second group information is applied.

A DL signal (e.g., PDCCH or PDSCH) is received according to the QCL assumption corresponding to the second DL RS or second group information.

A UL signal (e.g., PUCCH or PUSCH) is transmitted according to the spatial relation and path loss corresponding to the second DL RS or second group information.

The second DL RS can be applied to the CC/BWP, or the CC/BWP group, or the CORESET pool corresponding to the first DL RS.

As a result, the UE reporting the DL RS and group information that correspond to link 3, and, after receiving the gNB response, the UL and DL transmission corresponding to the panel-2 is updated to the DL RS and group information that correspond to link 3.

Fourth Example: UE Behavior after Receiving gNB Response

Once receiving gNB response, the UE request from the reporting should be applied accordingly. But, according to the decoding the command of gNB response, the ending or starting event for mapping between panel and DL RS should be clarified.

The duration of time over which the gNB assumes there will be no change, until next gNB confirmation or report from UE There is a new measurement restriction for initializing remapping between any panel and DL RS;

The mapping between DL RS and UE panel should be updated X time units after a new measurement.

It can be assumed as a group-based reporting with a flag configured by the gNB.

When the flag is configured for enabling the new mapping between DL RS and a group information, group information should be reported; otherwise, the group information is not reported.

The mapping between a DL RS and a group information is applied until the time unit corresponding to the next group-based reporting plus applicable timing that is up to UE capability.

There is a new indication of confirming updating panel mapping or group-based reporting from gNB side.

FIG. 5 shows an example of a method of wireless communication, in accordance with some example embodiments. At 510, the method includes receiving, by a wireless device from a network device, one or more reference signals. At 520, the method includes transmitting, by the wireless device, a report, wherein the report includes at least one of a first reference signal, a channel quality, an uplink transmission parameter, a first group information, a carrier component, or a control resource set pool.

Figure 6:
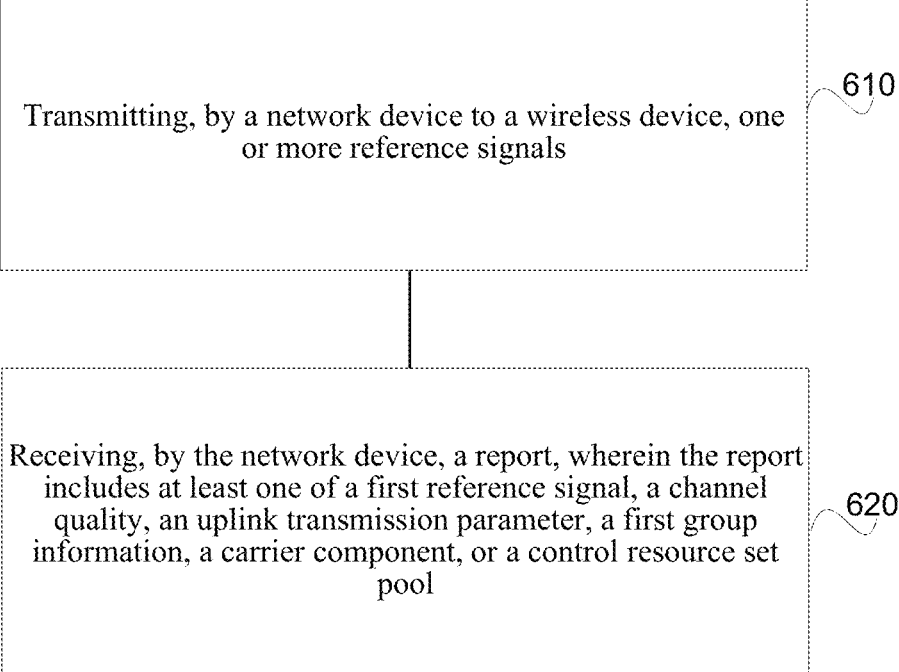
FIG. 6 shows an example of a method performed at a network device.

FIG. 6 shows another example of a method of wireless communication, in accordance with some example embodiments. At 610, the method includes transmitting, by a network device to a wireless device, one or more reference signals. At 620, the method includes receiving, by the network device, a report, wherein the report includes at least one of a first reference signal, a channel quality, an uplink transmission parameter, a first group information, a carrier component, or a control resource set pool.

Figure 7:
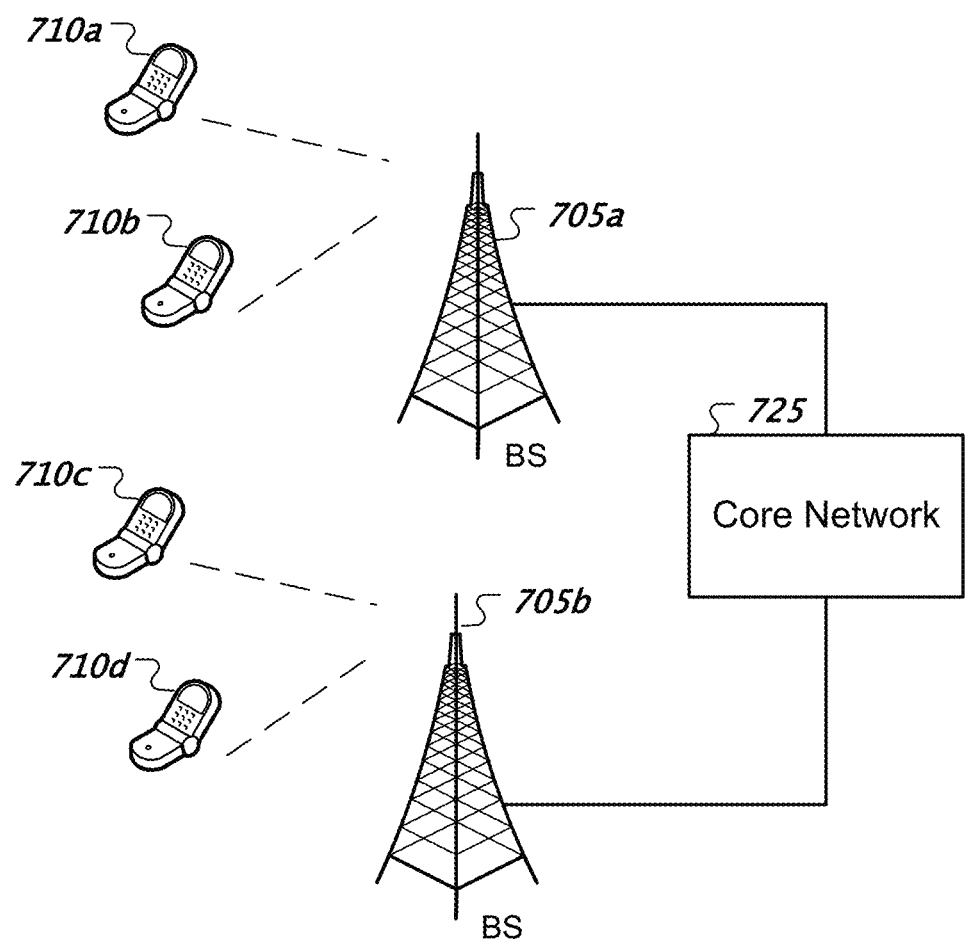
FIG. 7 shows a wireless communication system based on some example embodiments of the disclosed technology.

FIG. 7 shows an example of a wireless communication system 700 where techniques in accordance with one or more embodiments of the present technology can be applied. A wireless communication system 700 can include one or more base stations (BSs) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. The techniques and embodiments described in the present document may be implemented by the base stations or wireless devices described in the present document.

Figure 8:
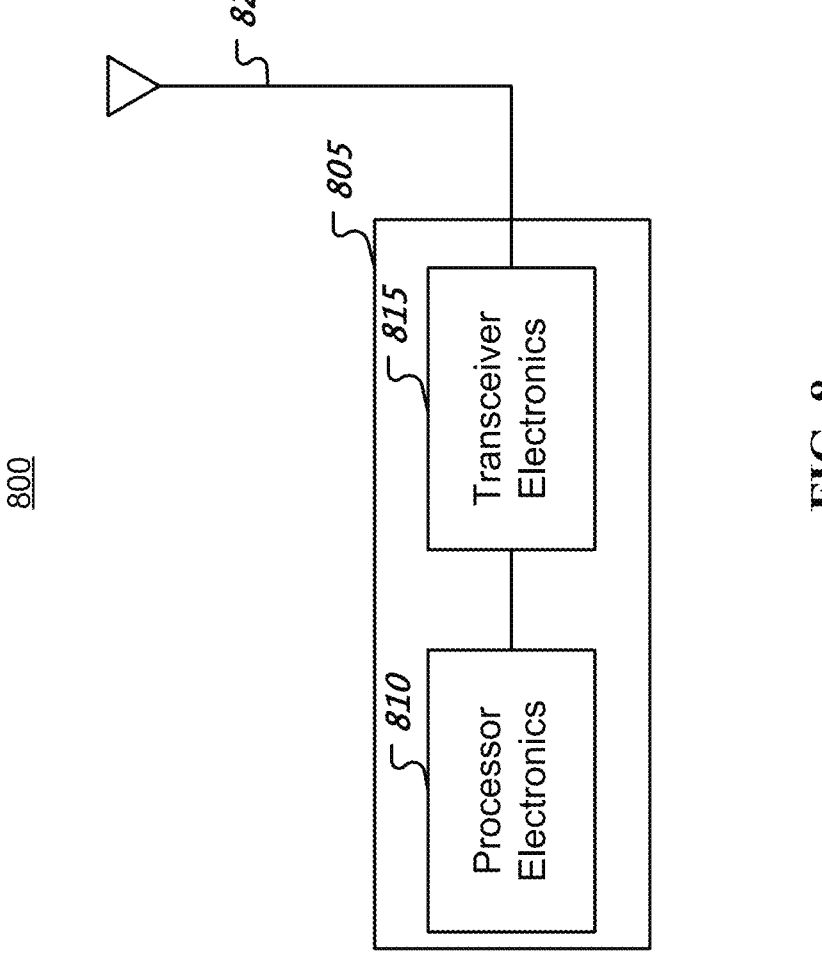
FIG. 8 shows a block diagram of a portion of a radio system based on some example embodiments of the disclosed technology.

FIG. 8 is a block diagram of a portion of a radio station in accordance with one or more embodiments of the present technology can be applied. A radio 805 such as a base station or a wireless device (or UE) can include processor electronics 810 such as a microprocessor that implements one or more of the wireless techniques presented in this document. The radio 805 can include transceiver electronics 815 to send and/or receive wireless signals over one or more communication interfaces such as antenna 820. The radio 805 can include other communication interfaces for transmitting and receiving data. Radio 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio 805. In some embodiments, the radio 805 may be configured to perform the methods described in this document.

The technical solutions described by the following clauses may be preferably implemented by some embodiments.

Clause 1. A method of wireless communication, comprising: receiving, by a wireless device from a network device, one or more reference signals; and transmitting, by the wireless device, a report, wherein the report includes at least one of a first reference signal, a channel quality, an uplink transmission parameter, a first group information, a carrier component, or a control resource set pool.

Clause 2. The method of clause 1, wherein the first reference signal or the uplink transmission parameter is associated with at least one of the first group information, the carrier component, or the control resource set pool.

Clause 3. The method of clause 1, wherein the uplink transmission parameter comprises at least one of a duty cycle, a back-off value, a power headroom, or a maximum power reduction, Clause 4. The method of clause 1, further comprising: receiving, by the wireless device, a confirmation message from the network device.

Clause 5. The method of claim 4, wherein the confirmation message comprises a downlink control information (DCI) or a media access control control element (MAC-CE) command.

Clause 6. The method of clause 4, wherein the confirmation message includes at least one of: a physical downlink control channel (PDCCH) or a DCI with a radio network temporary identity (RNTI), a PDCCH or a DCI in a control resource set (CORESET) or search space, a DCI codepoint, an indication for new data for an uplink shared channel carrying the report, a reconfiguration or an activation of a transmission configuration indicator associated with a downlink or uplink channel, or a reconfiguration or an activation of a spatial relation associated with a uplink channel.

Clause 7. The method of clause 6, wherein the indication for new data is associated with a same hybrid automatic repeat request (HARQ) process number as an uplink shared channel carrying the report.

Clause 8. The method of clause 1, further including at least one of: applying a mapping between the first reference signal and the first group information; receiving a downlink reference signal or a downlink channel according to the first reference signal or the first group information, or transmitting an uplink reference signal or an uplink channel according to the first reference signal or the first group information.

Clause 9. The method of clause 8, wherein the mapping between the first reference signal and the first group information is applied a predetermined time period after a measurement or the report.

Clause 10. The method of clause 8, wherein the mapping between the first reference signal and the first group information is applied until an offset time after a next group reporting.

Clause 11. The method of clause 10, wherein a configuration of the next group reporting includes a flag configured by the network device.

Clause 12. The method of clause 11, wherein in a case that the flag is configured for enabling a new mapping between a reference signal and the group information, the group information is reported.

Clause 13. The method of clause 8, wherein the downlink reference signal or the downlink channel is associated with a same carrier component, a same carrier component group, a same group information, or a same control resource set pool as the first reference signal.

Clause 14. The method of clause 8, wherein the uplink reference signal or the uplink channel is associated with a same carrier component, a same carrier component group, a same group information, or a same control resource set pool as the first reference signal.

Clause 15. The method of clause 1, wherein a first condition comprises a metric corresponding to a second reference signal or a second group information is less than or equal to a first threshold, and wherein the first condition is satisfied.

Clause 16. The method of clause 15, wherein the metric comprises a block error ratio, an uplink duty cycle or a maximum power reduction, and wherein the metric is greater than or equal to the first threshold.

Clause 17. The method of clause 15, wherein the metric comprises a channel quality indicator, a path loss or a reference signal receive power, and wherein the metric is less than or equal to the first threshold.

Clause 18. The method of clause 1, wherein a second condition comprises a metric corresponding to a third reference signal or a third group information is greater than or equal to a second threshold, and wherein the second condition is satisfied.

Clause 19. The method of clause 18, wherein the metric comprises a block error ratio, an uplink duty cycle or a maximum power reduction, and wherein the metric is less than or equal to the second threshold.

Clause 20. The method of clause 18, wherein the metric comprises a channel quality indicator, a path loss or a reference signal receive power, and wherein the metric is greater than or equal to the second threshold.

Clause 21. The method of clause 1, wherein a third condition comprises at least one of: a metric corresponding to a second reference signal or a second group information is less than or equal to a second metric corresponding to a third reference signal or a third group information; or a third metric corresponding to the second reference signal or the second group information is less than or equal to a fourth metric corresponding to the third reference signal or the third group information plus an offset, wherein the third condition is satisfied.

Clause 22. The method of clause 21, wherein the offset is configured by a command transmitted by the network device.

Clause 23. The method of clauses 18 or 21, wherein the third reference signal is the first reference signal, or wherein the third group information is the first group information.

Clause 24. The method of any one of clauses 13 to 21, wherein the metric corresponds to a change in a metric result.

Clause 25. The method of claim 1, wherein the report comprises at least one of a physical uplink control channel, an uplink control information, or a media access control control element (MAC-CE) message.

Clause 26. The method of clause 1, wherein a triggering event comprises exceeding a maximum permissible exposure to radio frequency energy to a user, and wherein the triggering event occurs.

Clause 27. A method of wireless communication, comprising: detecting, by a wireless device, a triggering event limiting a transmitted power by a first beam of a wireless device, wherein the first beam has a maximum power reduction that is greater than or equal to a first threshold or an uplink duty cycle that is greater than or equal to a second threshold; identifying, by the wireless device, a new beam wherein the new beam has a value of a second maximum power reduction subtracted from a reference signal receive power that is greater than or equal to a third threshold; and reporting, by the wireless device to the network device, at least one parameter of the new beam in a report, wherein the report is transmitted via a MAC-CE maximum power reduction procedure or power headroom reporting procedure.

Clause 28. The method of clause 27, wherein a triggering event comprises exceeding a maximum permissible exposure to radio frequency energy to a user, and wherein the triggering event occurs.

Clause 29. A method of wireless communication, comprising: transmitting, by a network device to a wireless device, one or more reference signals; receiving, by the network device, a report, wherein the report includes at least one of a first reference signal, a channel quality, an uplink transmission parameter, a first group information, a carrier component, or a control resource set pool.

Clause 30. The method of clause 29, wherein the first reference signal or the uplink transmission parameter is associated with at least one of the first group information, the carrier component, or the control resource set pool.

Clause 31. The method of clause 29, wherein the uplink transmission parameter comprises at least one of a duty cycle, a back-off value, a power headroom, or a maximum power reduction, Clause 32. The method of clause 29, further comprising: transmitting, by the network device, a confirmation message to the wireless device.

Clause 33. The method of clause 32, wherein the confirmation message comprises a downlink control information (DCI) or a media access control control element (MAC-CE) command.

Clause 34. The method of clause 32, wherein the confirmation message includes at least one of: a PDCCH or a DCI with an RNTI, a PDCCH or a DCI in a CORESET or search space, a DCI codepoint, an indication for new data for an uplink shared channel carrying the report, a reconfiguration or an activation of a transmission configuration indicator associated with a downlink or uplink channel, or a reconfiguration or an activation of a spatial relation associated with a uplink channel.

Clause 35. The method of clause 34, wherein the indication for new data is associated with a same hybrid automatic repeat request (HARQ) process number as an uplink shared channel carrying the report.

Clause 36. The method of clause 29, further including at least one of: applying a mapping between the first reference signal and the first group information; transmitting a downlink reference signal or a downlink channel according to the first reference signal or the first group information, or receiving an uplink reference signal or an uplink channel according to the first reference signal or the first group information.

Clause 37. The method of clause 36, wherein the mapping between the first reference signal and the first group information is applied a predetermined time period after a measurement or the report.

Clause 38. The method of clause 36, wherein the mapping between the first reference signal and the first group information is applied until an offset time after a next group reporting.

Clause 39. The method of clause 38, wherein a configuration of the next group reporting includes a flag configured by the network device.

Clause 40. The method of clause 36, wherein the downlink reference signal or the downlink channel is associated with a same carrier component, a same carrier component group, a same group information, or a same control resource set pool as the first reference signal.

Clause 41. The method of clause 36, wherein the uplink reference signal or an uplink channel metric is associated with a same carrier component, a same carrier component group, a same group information, or a same control resource set pool as the first reference signal.

Clause 42. The method of clause 29, wherein a first condition comprises a metric corresponding to a second reference signal or a second group information is less than or equal to a first threshold, and wherein the first condition is satisfied.

Clause 43. The method of clause 42, wherein the metric comprises a block error ratio, an uplink duty cycle or a maximum power reduction, and wherein the metric is greater than or equal to the first threshold.

Clause 44. The method of clause 42, wherein the metric comprises a channel quality indicator, a path loss or a reference signal receive power, and wherein the metric is less than or equal to the first threshold.

Clause 45. The method of clause 29, wherein a second condition comprises a metric corresponding to a third reference signal or a third group information is greater than or equal to a second threshold, and wherein the second condition is satisfied.

Clause 46. The method of clause 45, wherein the metric comprises a block error ratio, an uplink duty cycle or a maximum power reduction, and wherein the metric is less than or equal to the second threshold.

Clause 47. The method of clause 45, wherein the metric comprises a channel quality indicator, a path loss or a reference signal receive power, and wherein the metric is greater than or equal to the second threshold.

Clause 48. The method of clause 29, wherein a third condition comprises at least one of: a metric corresponding to a second reference signal or a second group information is less than or equal to a second metric corresponding to a third reference signal or a third group information; or a third metric corresponding to the second reference signal or the second group information is less than or equal to a fourth metric corresponding to the third reference signal or the third group information plus an offset, wherein the third condition is satisfied.

Clause 49. The method of clause 48, wherein the offset is configured by a command transmitted by the network device.

Clause 50. The method of clauses 45 or 48, wherein the third reference signal is the first reference signal, or wherein the third group information is the first group information.

Clause 51. The method of any one of clauses 40 to 48, wherein the metric corresponds to a change in a metric result.

Clause 52. The method of clause 29, wherein the report includes at least one of a physical uplink control channel, an uplink control information, or a media access control control element (MAC-CE) message.

Clause 53. The method of clause 39, wherein in a case that the flag is configured for enabling a new mapping between a reference signal and the group information, the group information is reported.

Clause 54. An apparatus for wireless communication, comprising a processor, wherein the processor is configured to implement a method recited in any of clauses 1 to 53.

Clause 55. A computer readable program storage medium having code stored thereon, the code, when executed by a processor, causing the processor to implement a method recited in any of clauses 1 to 53.

In the technical solutions described herein in clause format, the wireless device may be a UE such as a mobile phone or a tablet or any other device capable of wireless communication and the network device may be a network-side equipment such as a base station. FIG. 8 shows an example hardware platform for implementing the wireless node or the network node.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

What is claimed is:

1. A method of wireless communication, comprising:

receiving, by a wireless device from a network device, one or more reference signals;

transmitting, by the wireless device, a report, wherein the report indicates a first reference signal, a first group information, and a carrier component, wherein the first reference signal is associated with a control resource set (CORESET) pool, wherein a first condition comprises a metric corresponding to a second reference signal or a second group information is greater than or equal to a first threshold, wherein the first condition is satisfied, and wherein the metric comprises a block error ratio, an uplink duty cycle, or a maximum power reduction;

receiving, by the wireless device, a confirmation message from the network device, wherein the confirmation message comprises a downlink control information (DCI) with an indication for new data for an uplink shared channel of the report in a control resource set (CORESET) or search space, and wherein the indication for new data for the uplink shared channel of the report is associated with a same hybrid automatic repeat request (HARQ) process number as the uplink shared channel of the report; and performing:

receiving a downlink reference signal or a downlink channel according to the first reference signal, wherein the downlink reference signal or the downlink channel is associated with a same control resource set pool as the first reference signal, and transmitting an uplink reference signal or an uplink channel according to the first reference signal, wherein the uplink reference signal or the uplink channel is associated with a same control resource set pool as the first reference signal.

2. The method of claim 1, wherein the report comprises a media access control control element (MAC-CE) message.

3. A wireless communication apparatus, comprising:

at least one processor and memory with executable instructions stored thereon, the executable instructions causing, when executed, operations comprising:

receiving, by a wireless device from a network device, one or more reference signals;

transmitting, by the wireless device, a report, wherein the report indicates a first reference signal, a first group information, and a carrier component, wherein the first reference signal is associated with a control resource set (CORESET) pool, wherein a first condition comprises a metric corresponding to a second reference signal or a second group information is greater than or equal to a first threshold, wherein the first condition is satisfied, and wherein the metric comprises a block error ratio, an uplink duty cycle, or a maximum power reduction;

receiving, by the wireless device, a confirmation message from the network device, wherein the confirmation message comprises a downlink control information (DCI) with an indication for new data for an uplink shared channel of the report in a control resource set (CORESET) or search space, and wherein the indication for new data for the uplink shared channel of the report is associated with a same hybrid automatic repeat request (HARQ) process number as the uplink shared channel of the report; and performing:

receiving a downlink reference signal or a downlink channel according to the first reference signal, wherein the downlink reference signal or the downlink channel is associated with a same control resource set pool or a same first group information as the first reference signal, and transmitting an uplink reference signal or an uplink channel according to the first reference signal, wherein the uplink reference signal or the uplink channel is associated with a same control resource set pool or a same first group information as the first reference signal.

4. The wireless communication apparatus of claim 3, wherein the report comprises a media access control control element (MAC-CE) message.

5. A method of wireless communication, comprising:

transmitting, by a network device to a wireless device from, one or more reference signals;

receiving, by the network device, a report, wherein the report indicates a first reference signal, a first group information, and a carrier component, wherein the first reference signal is associated with a control resource set (CORESET) pool, wherein a first condition comprises a metric corresponding to a second reference signal or a second group information is greater than or equal to a first threshold, wherein the first condition is satisfied, and wherein the metric comprises a block error ratio, an uplink duty cycle, or a maximum power reduction;

transmitting, by the network device, a confirmation message to the wireless device, wherein the confirmation message comprises a downlink control information (DCI) with an indication for new data for an uplink shared channel of the report in a control resource set (CORESET) or search space, and wherein the indication for new data for the uplink shared channel of the report is associated with a same hybrid automatic repeat request (HARQ) process number as the uplink shared channel of the report; and performing:

transmitting a downlink reference signal or a downlink channel according to the first reference signal, wherein the downlink reference signal or the downlink channel is associated with a same control resource set pool or a same first group information as the first reference signal, and receiving an uplink reference signal or an uplink channel according to the first reference signal, wherein the uplink reference signal or the uplink channel is associated with a same control resource set pool or a same first group information as the first reference signal.

6. A wireless communication apparatus, comprising:

at least one processor and memory with executable instructions stored thereon, the executable instructions causing, when executed, operations comprising:

transmitting, by a network device to a wireless device from, one or more reference signals;

receiving, by the network device, a report, wherein the report indicates a first reference signal, a first group information, and a carrier component, wherein the first reference signal is associated with a control resource set (CORESET) pool, wherein a first condition comprises a metric corresponding to a second reference signal or a second group information is greater than or equal to a first threshold, wherein the first condition is satisfied, and wherein the metric comprises a block error ratio, an uplink duty cycle, or a maximum power reduction;

transmitting, by the network device, a confirmation message to the wireless device, wherein the confirmation message comprises a downlink control information (DCI) with an indication for new data for an uplink shared channel of the report in a control resource set (CORESET) or search space, and wherein the indication for new data for the uplink shared channel of the report is associated with a same hybrid automatic repeat request (HARQ) process number as the uplink shared channel of the report; and performing transmitting a downlink reference signal or a downlink channel according to the first reference signal, wherein the downlink reference signal or the downlink channel is associated with a same control resource set pool or a same first group information as the first reference signal, and receiving an uplink reference signal or an uplink 5 channel according to the first reference signal, wherein the uplink reference signal or the uplink channel is associated with a same control resource set pool or a same first group information as the first reference signal. 10

7. The wireless communication apparatus of claim 6, wherein the report comprises a media access control control element (MAC-CE) message.

\* \* \* \* \*